United States Patent [19]
Ojima

[11] 3,869,916
[45] Mar. 11, 1975

[54] DEPTH GAUGE FOR DIVER

[76] Inventor: Yukio Ojima, 34-7 Naka-Machi, Tokyo, Japan

[22] Filed: July 30, 1973

[21] Appl. No.: 384,004

[30] Foreign Application Priority Data
Feb. 7, 1973 Japan.............................. 48-15698

[52] U.S. Cl...................... 73/300, 73/418, 73/431
[51] Int. Cl............................................. G01f 23/14
[58] Field of Search............. 73/300, 431, 291, 418; 52/152 R

[56] References Cited
UNITED STATES PATENTS

| | | | |
|---|---|---|---|
| 2,935,873 | 5/1960 | Stewart............................ | 73/300 |
| 3,203,244 | 8/1965 | Alinari.................................. | 73/300 |
| 3,505,808 | 4/1970 | Eschle............................... | 58/152 R |
| 3,759,101 | 9/1973 | Borom et al.......................... | 73/291 |

*Primary Examiner*—Richard C. Queisser
*Assistant Examiner*—Daniel M. Yasich
*Attorney, Agent, or Firm*—Ostrolenk, Faber, Gerb & Soffen

[57] ABSTRACT

A depth gauge for a diver having a Bourdon tube and a diaphragm. The pressure inlet of the Bourdon tube is connected to an oil reservoir, a part of which oil reservoir is formed with the diaphragm. The watertight case of the gauge is provided with grooves in order to supply the environmental water pressure onto the diaphragm.

1 Claim, 3 Drawing Figures

PATENTED MAR 11 1975 3,869,916

DEPTH GAUGE FOR DIVER

This invention relates in general to an instrument for measuring pressures of liquids, and more particularly to a depth gauge for divers.

Bourdon tubes are conventionally used for measuring pressures of liquids. The Bourdon tube is flattened in cross section and bent into circular form. One end of the tube is soldered to a block through which fluid enters, and the other end is sealed and coupled by a link to a pivoted spindle. An increase of pressure within the tube tends to change the cross section of the tube from flattened to circular, and the tube consequently uncoils slightly, thus turning a pointer. The Bourdon tube may be used for measuring the depth of water, if a watertight case is provided with a pressure inlet opened to the water. A Bourdon tube gauge of the type described is, however, objectionable if it is used by a sea-diver, because the tube will be soon damaged by the corrosive action of sea-water unless it is washed by fresh water after every use.

The present invention provides, therefore, an improved Bourdon gauge which can be used by a sea-diver free from care after use. The depth gauge of the invention is also embodied to be carried by a diver like a wrist watch and is devised to be sensitive to the change of water pressure.

To the accomplishment of the above, and to such other objects as may hereinafter appear, the present invention relates to the depth gauge for divers as defined in the appended claims and as described in this specification, taken together with the accompanying drawings in which:

Figure 1:
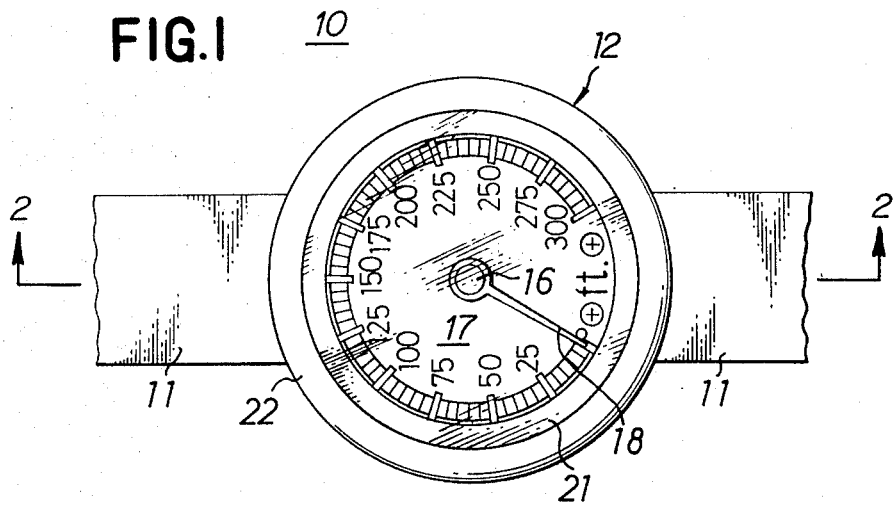
FIG. 1 is a top plan view of a depth gauge according to the invention.
Figure 2:
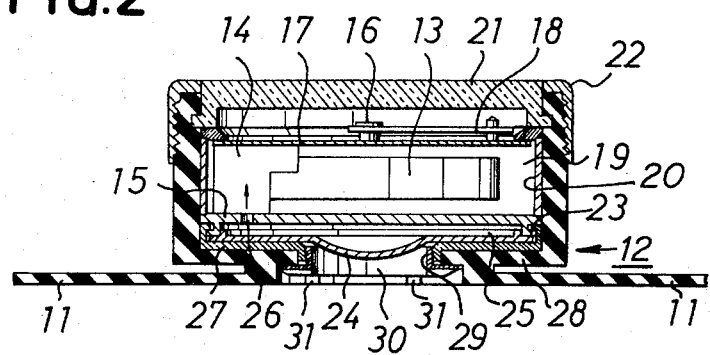
FIG. 2 is a cross sectional view taken along the line 2—2 of FIG. 1.
Figure 3:
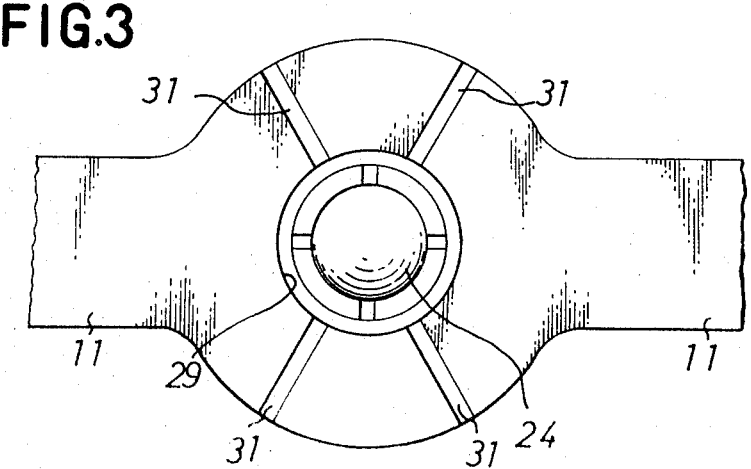
FIG. 3 is a bottom plan view of the depth gauge.

The present invention depth gauge is made in the form of a wrist watch generally designated 10 having a rubber strap 11 which is integrally moulded with the case 12 of the gauge. The depth gauge 10 includes a Bourdon tube 13, an end of which tube is soldered to a block member 14 fixedly mounted on a rigid base plate 15. The other end of the Bourdon tube 13 is sealed and coupled by a link (not shown) to a pivoted quadrant with teeth meshing with those of a pinion on a pointer spindle 16 rotatably mounted on a dial disc 17. The mechanism of the Bourdon tube is known per se. Therefore detailed illustration is omitted. It will suffice to say that an increase of pressure within the Bourdon tube 13 causes the spindle 16 to rotate for indicating the developed pressure or the depth of water on the scale of dial disc 17 by a pointer 18.

A chamber 19 in which the Bourdon tube 13 and the works thereof are disposed, is concealed by a rigid side frame 20 as well as the base plate 15 and the dial disc 17. The dial disc 17 is protected by a pressure glass 21. The glass cover 21 is watertightly secured to the gauge case 12 by a cap ring 22 threaded onto the case 12. Thus, the chamber 19 of the Bourdon tube mechanism and a space between the dial disc 17 and the cover glass 21 are sealed tightly against water pressure.

Peripherally projected from the underside of the base plate 15, is a spacer ring 23 which serves to hold the peripheral edge portion of a diaphragm 24. A chamber 25 which is defined with the base plate 15 and the diaphragm 24, is filled with oil. The base plate 15 has an opening 26 communicating with oil chamber 25 with an oil passage (not shown) in the block 14. The block 14 is so constructed that the oil flows in and out of the Bourdon tube 13 depending upon the pressure developed in the chamber 25 owing to an elastic deformation of the diaphragm 24. The diaphragm 24 is supported by an annular disc 27 which in turn is watertighly held by the bottom wall 28 of the gauge case 12 by means of a flange member 29 threaded to the rubber case 12 as shown.

Thus the underside of the central portion of the diaphragm 24 is exposed to water pressure through a cavity 30 which is defined with the flange member 29 and the diaphragm at the center portion of the bottom 28 of the gauge case.

The depth gauge of the invention is designed to be carried by a diver who especially wears a wet suit. Thus, the rubber case 12 of the gauge is formed integral with the rubber strap 11 which is adapted to fit onto the wrist portion of the diver's suit. The integral structure of the gauge case with the strap is advantageous to make the outer dimensions of the gauge be compacted and thin.

The close fitting of the gauge to the diver's wrist sometimes clogs the cavity 30 from its free admission of water, resulting in an incorrect indication by the pointer 18 of the water pressure or the depth of dive on the dial disc 17 of the gauge.

Thus, a plurality of grooves 31 are formed on the bottom wall 28 of the gauge case for providing water passages extending between the cavity 30 beneath the diaphragm 24 and the environment of the gauge as shown. Therefore, the diaphragm 24 is always subjected to the environmental water pressure and sensitively operates to increase or decrease the oil pressure within the oil reservoir 25 as well as the Bourdon tube 13 depending upon increase or decrease of the water pressure.

I claim:

1. A depth gauge for use by a diver comprising:

a hollow rubber case open at one end and having a rubber strap integrally molded to opposite sides of the rubber case adjacent the base of said case;

said strap being resilient and stretchable and adapted to snugly fit upon a diver's wrist;

said base having a cavity with an opening communicating with the interior of the case;

a flexible diaphragm overlying and sealing the cavity opening;

a support plate positioned above said diaphragm and cooperating with said case and said diagraphm to define a first oil filled chamber;

a block member positioned upon said base plate and having a passageway;

a Bourdon tube having an inlet opening communicating with one end of the passageway in said block member;

said support plate having an opening communicating with the opposite end of said passageway to admit oil into or withdraw oil from said tube as said diaphragm alters its contour and hence alters the volume of said first chamber due to changes in the ambient pressure surrounding the case;

pivotally mounted pointer means and means coupled between said pointer means and said tube for pivoting said pointer means as the free end of said tube moves responsive to oil entering or leaving said tube;

a transparent pressure glass covering the open end of said case and means for securing and water-tightly sealing said glass to said case;

said pointer means being positioned beneath said glass and including a graduated dial face cooperating with a pointer;

the exterior of said base engaging the wrist of the diver and having substantially radially aligned grooves extending between said cavity and the perimeter of said case to provide conduits to facilitate communication of the fluid medium external to said case with said diaphragm;

said diaphragm being displaced inwardly from the exterior surface of said base to prevent the diaphragm from engaging the diver's wrist.

* * * * *